United States Patent [19]

Cassens, Jr.

[11] Patent Number: 4,463,100
[45] Date of Patent: Jul. 31, 1984

[54] REFRACTORY GUN MIX

[75] Inventor: Nicholas Cassens, Jr., Pleasanton, Calif.

[73] Assignee: Kaiser Aluminum & Chemical Corporation, Oakland, Calif.

[21] Appl. No.: 512,073

[22] Filed: Jul. 8, 1983

[51] Int. Cl.³ .................. C04B 35/04; C04B 35/22
[52] U.S. Cl. ................................. 501/108; 501/123
[58] Field of Search .............................. 501/108, 123

[56] References Cited

U.S. PATENT DOCUMENTS

| | | | |
|---|---|---|---|
| 710,916 | 10/1902 | Knox | 501/108 |
| 3,193,402 | 2/1965 | Rusoff et al. | 501/123 |
| 3,262,793 | 7/1966 | Neely et al. | 501/123 |
| 3,798,043 | 3/1974 | Wallouch | 106/104 |
| 4,222,786 | 9/1980 | Tuovinen et al. | 106/117 |

FOREIGN PATENT DOCUMENTS 2058041  4/1981  United Kingdom ............... 501/101

Primary Examiner—James Poer
Attorney, Agent, or Firm—Malcolm McQuarrie

[57] ABSTRACT

A low cost stabilized lime aggregate, preferably with dicalcium silicate as a major constituent, is obtained from slags of specified composition, and finds use in refractory gun mixes. Briefly, the slags which are suitable for this application contain at least 75% total $CaO + Fe_2O_3 + SiO_2 + MgO$, have a $CaO:SiO_2$ weight ratio of at least 1.8, less than 7% total calcium carbonate ($CaCO_3$), calcium hydroxide ($Ca(OH)_2$), and CaO, and preferably contain at least 20% CaO.

8 Claims, No Drawings

REFRACTORY GUN MIX

BACKGROUND OF THE INVENTION

This invention pertains to refractory gun mixes, particularly such mixes containing a significant portion of stabilized lime aggregate.

Both the refractories producer and the refractories user have sought for many years to reduce their costs, for example by searching for lower cost refractory aggregates.

One very abundant, and therefore low cost, material of great refractoriness is lime (CaO). However, this material shows such a marked tendency to hydrate in the presence of any moisture, and also to form calcium carbonate ($CaCO_3$) in the presence of carbon dioxide ($CO_2$), that it is essentially useless as a refractory material, except in the most specialized circumstances.

Another very abundant, low cost source of refractory aggregate is dolomite, a roughly equimolar mixture of magnesium and calcium carbonates. This material is widely used as a refractory raw material, particularly in Europe, but also to a significant extent in the United States. However, it too suffers from the tendency of the lime contained in it to hydrate, and special precautions must be taken in using dolomite refractories to deal with this hydration tendency.

The present invention is directed to the use of another relatively low cost refractory material, the material referred to herein as "stabilized lime aggregate." While this material can be obtained from various sources, because of their great abundance and relative low cost, slags, for example slags from steelmaking processes, have proved to be a good source of this stabilized lime aggregate.

The use of slags in refractory materials has long been known; for example, U.S. Ser. No. 710,916 suggests the use of slag in a ramming mix for lining converters or furnaces. The use of slag is also suggested in U.S. Pat. No. 3,798,043, U.S. Pat. No. 4,222,786 and in British Application No. 2,058,041. However, the slags suggested for use in these patents differ significantly from the materials used in the practice of the present invention.

SUMMARY OF THE INVENTION

It has now been found according to this invention that a gun mix of good performance and relatively low cost is obtained when it consists essentially of from 5 to 95% of a stabilized lime aggregate, said aggregate containing at least 75% total $CaO+Fe_2O_3+SiO_2+MgO$, the remainder being other refractory oxides, the $CaO$:$SiO_2$ weight ratio being at least 1.8, whereby dicalcium silicate is a major crystalline phase in the aggregate, said aggregate having less than 7% free lime, from 1 to 10% of a basic inorganic bond, and from 0.05 to 5% plasticizer, the balance of the composition being basic refractory aggregate, all percentages being by weight based on the total weight of the composition.

DETAILED DESCRIPTION

The stabilized lime aggregate used in this invention may be obtained from any suitable source, providing the material has the specified chemical composition, but for reasons of economy it is preferred that the source be a slag material. Such materials are produced in various steelmaking processes and are regarded as essentially waste products from such processes. Accordingly, they are readily available at relatively low cost.

The important characteristic of the stabilized lime aggregate of this invention is its chemical composition: it will contain at least 75% $CaO+Fe_2O_3+SiO_2+MgO$ and the weight ratio of CaO to $SiO_2$ will be at least 1.8. Those skilled in the art will recognize that this weight ratio of lime to silica indicates that lime and silica will combine to form dicalcium silicate. Of course, in the presence of significant amounts of $Fe_2O_3$, other crystalline compounds of iron and/or lime and/or silica will form. It is also essential that the aggregate have a minimum amount, less than 7%, and preferably less than 5%, of lime in a form, for example either CaO, or calcium carbonate or calcium hydroxide, which is not combined with another refractory oxide. Such uncombined lime is herein referred to as "free lime." While the chemical constituents of the stabilized lime aggregate will largely be present in the form of crystalline compounds, slags are generally regarded as glassy materials (since they exist in the molten state in the steelmaking processes, and are rapidly cooled when discharged from such processes, they will often contain a significant amount of glassy material). However, a slag containing the specified overall chemical composition will be suitable for use in this invention.

In addition to the stabilized lime aggregate, gun mix compositions according to this invention may also contain other refractory aggregates, preferably basic aggregates such as periclase and/or chrome ore. Most preferably, gun mixes according to the present invention, if they contain any aggregate in addition to the stabilized lime aggregate, contain a periclase containing at least 80% MgO.

The aggregate will be sized according to good practice, as is well-known to those skilled in the art, to achieve good flow through the gunning apparatus and good adherence and density when placed, for example on a furnace wall.

Also, the gun mixes of the present invention will contain a suitable bond, any of various bonds well-known for this purpose being suitable. Specific examples of such bonds are given in the examples which follow.

In addition, as is conventional in gun mixes, the compositions will contain a plasticizer, either on organic plasticizer (in which case the amount used will be relatively low, for example from 0.05 to 1%) or a mineral plasticizer such as bentonite (in which case a relatively larger amount will be used, for example from 1 to 5%).

These various ingredients will be admixed by the refractories manufacturer and shipped to the customer, for example in bags containing 25 or 50 kg (50 or 100 pound sacks), or even larger containers. The user will place the composition in a refractory gun or similar apparatus and use it to repair or maintain a furnace lining by gunning onto the surface of the lining, either when it is still hot, or after it has cooled down, all as is well-known in this art.

EXAMPLES

Table I shows the compositions of various gun mixes within the scope of this invention, together with certain comparison compositions. Specifically, Compositions 1 through 12 are within the scope of the present invention whereas Compositions 13, 14 and 15 are comparison examples. The amounts shown are parts by weight. The chemical analyses of the various aggregates used are given in Table II.

Stabilized lime aggregate A is an open hearth slag, whereas B is a BOF (basic oxygen furnace) slag, and C is an EAF (electric arc furnace) slag. Aggregates D, E and F, which are used in the comparison examples not within the scope of this invention, are, respectively, a so-called "nickel" slag, a blast furnace slag, and a desulfurization blast furnace slag. The term "desulfurization" refers to the point in the iron making process at which the slag is used.

Table I also indicates the types and amounts of the various bonding materials used with these gun mixes, all these bonds being generally well-known in the art and the subject of United States patents. Specifically, the bond used in Compositions 1, 2 and 7 is the subject of U.S. Pat. No. 4,276,091; the bond used in Compositions 3, 4, 5, 6, 8, and 10 through 15 is the subject of U.S. Pat. No. 4,244,744; and the bond used in Composition 9 is the subject of U.S. Pat. No. 4,001,029.

In addition, Compositions 3, 4 and 6 have been commercially produced and used to repair the linings of electric arc furnaces, where they performed well and enabled the operators to maintain the linings indefinitely. In other words, they gave as good service as prior art mixes containing raw materials costing 8 or more times the cost of the stabilized lime aggregates used in this invention.

Compositions 13, 14 and 15, made with stabilized lime aggregates outside the scope of this invention, were similarly admixed and gunned, but showed various deficiencies. For example, Compositions 14 and 15 exhibited a distinct odor of hydrogen sulfide (H2S) when gunned; in addition, the gunned samples melted at 1455° C. and dripped off the test furnace wall. In other words, Compositions 14 and 15 were not sufficiently refractory. Composition 13, while not showing the hydrogen sulfide odor, did show a vitrified layer 2½ inches (64 cm) deep when burned in at 1495° C., whereas comparable Composition 4, when burned into the same temperature,

TABLE I

| Composition | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Aggr. - stab. lime - type | A | A | B | A | A | A | A | A | A | B | A | C | D | E | F |
| amt | 77 | 77 | 8.2 | 77 | 29.4 | 46.3 | 29.4 | 95 | 95 | 95 | 47.0 | 32 | 77 | 77 | 77 |
| magnesia - type | X | X | X | X | X | X | X | — | — | — | X | X | X | X | X |
| amt | 18 | 18 | 87.3 | 18 | 66.1 | 49.2 | 65.6 | — | — | — | 18.0 | 18 | 18 | 18 | 18 |
| other - type | — | — | — | — | — | — | — | — | — | — | Y | Y | — | — | — |
| amt | — | — | — | — | — | — | — | — | — | — | 30 | 45 | — | — | — |
| Bond - NaSi (GD) | — | — | 1.9 | 1.9 | 1.9 | 1.9 | — | 1.9 | — | 1.9 | 1.9 | 1.9 | 1.9 | 1.9 | 1.9 |
| Gypsum | — | — | 1.1 | 1.1 | 1.1 | 1.1 | — | 1.1 | — | 1.1 | 1.1 | 1.1 | 1.1 | 1.1 | 1.1 |
| Al Sulf | 1.3 | 1.5 | — | — | — | — | 1.3 | — | 2.2 | — | — | — | — | — | — |
| Hydr Lime | — | — | — | — | — | — | — | — | 0.8 | — | — | — | — | — | — |
| STPP | 1.7 | — | — | — | — | — | 1.7 | — | — | — | — | — | — | — | — |
| Glass H | — | 1.5 | — | — | — | — | — | — | — | — | — | — | — | — | — |
| Bentonite | 2.0 | 2.0 | 1.5 | 2.0 | 1.5 | 1.5 | 2.0 | 2.0 | 2.0 | 2.0 | 2.0 | 2.0 | 2.0 | 2.0 | 2.0 |

TABLE II

| Aggregate | A | B | C* | D | E | F | X | Y |
|---|---|---|---|---|---|---|---|---|
| CaO | 24.2 | 39.8 | 35 | 2.4 | 35.1 | 13.4 | 1.0 | 48.9 |
| SiO2 | 12.6 | 12.7 | 20 | 34.1 | 38.6 | 13.6 | 2.1 | 0.6 |
| Fe2O3 | 44.4 | 29.5 | 20 | 48.5 | 1.1 | 63.1 | 0.6 | 11.0 |
| MgO | 7.7 | 9.2 | 5 | 6.2 | 16.5 | 5.2 | 95.5 | 39.1 |
| Al2O3 | 2.8 | 1.2 | 12 | 6.0 | 6.8 | 3.1 | 0.4 | 0.3 |
| MnO | 5.2 | 4.6 | 12 | 0.05 | 0.5 | 0.9 | — | — |
| Cr2O3 | 0.5 | 0.1 | 5 | 0.1 | 0.1 | 0.1 | 0.4 | — |
| TiO2 | 0.9 | 0.8 | 0.5 | 0.2 | 0.4 | 0.3 | — | 0.1 |
| P2O5 | 1.2 | 1.2 | — | 0.01 | 0.1 | <0.05 | — | — |
| F | 0.3 | 0.8 | — | — | — | — | — | — |
| S | 0.2 | 0.1 | — | — | — | — | — | — |
| K2O | — | — | — | 1.4 | 0.3 | 0.1 | — | — |
| Na2O | — | — | — | 1.1 | 0.5 | 0.2 | — | — |
| C/S ratio | 1.9 | 3.1 | 1.8 | 0.07 | 0.9 | 1.0 | — | — |

*Semiquantitative analysis; petrographic examination indicates dicalcium silicate is dominant phase.

As can be seen, the compositions range from those (such as 8, 9 and 10) in which all the aggregate is a stabilized lime aggregate, through the bulk of the compositions which contain stabilized lime aggregate together with periclase aggregate, up to compositions such as 11 and 12 which contain dolomite as well as periclase and stabilize lime aggregate.

The compositions according to this invention were admixed in a V-Blender mixer for 5 minutes and were transferred to a batch gun wherein water was admixed with the compositions at the nozzle as they were gunned onto a furnace wall. All gunned well with smooth, surgeless flow, and exhibited a good water range, for example from 6 to 20% water. They build up well on the furnace wall and had low rebound, ranging from about 6 to about 18%.

showed only 1 inch (2.5 cm) depth of vitrification. This shows the much greater refractories of Composition 4 compared to Composition 13, and indicates that the latter composition would be unsuitable for use in furnaces such as steel-producing furnaces.

In summary, it is the discovery of this invention that it is possible to produce an effective gun mix from relatively low cost raw materials if the gun mix includes a stabilized lime aggregate selected in accordance with the criteria of this invention, namely that it contain at least 75% total CaO+Fe2O3+SiO2+MgO, that the CaO:SiO2 weight ratio is at least 1.8 and that it contain less than 7% free lime. While compositions containing as little as 5% stabilized lime aggregate are effective, best results are obtained with mixes containing at least 25% of such aggregate.

I claim:

1. A refractory composition suitable for gunning consisting essentially of from 5 to 95% of a stabilized lime aggregate, said aggregate containing at least 75% total CaO+Fe2O3+SiO2+MgO, the remainder being other refractory oxides, the CaO:SiO2 weight ratio being at least 1.8, whereby dicalcium silicate is a major crystalline phase in the aggregate, said aggregate having less than 7% free lime, from 1 to 10% of a basic inorganic bond, and from 0.05 to 5% plasticizer, the balance of the composition being basic refractory aggregate, all percentages being by weight based on the total weight of the composition.

2. Composition according to claim 1 containing at least 25% stabilized lime aggregate.

3. Composition according to claim 1 wherein the stabilized lime aggregate contains at least 20% by weight CaO.

4. Composition according to claim 3 containing at least 25% stabilized lime aggregate.

5. Composition according to claim 1 wherein the basic refractory aggregate is periclase containing at least 80% MgO.

6. Composition according to claim 2 wherein the basic refractory aggregate is periclase containing at least 80% MgO.

7. Composition according to claim 3 wherein the basic refractory aggregate is periclase containing at least 80% MgO.

8. Composition according to claim 4 wherein the basic refractory aggregate is periclase containing at least 80% MgO.

* * * * *